US010897189B2

(12) United States Patent
Malchow et al.

(10) Patent No.: US 10,897,189 B2
(45) Date of Patent: Jan. 19, 2021

(54) METHOD FOR ACTUATING A CONVERTER, CONTROL APPARATUS FOR A CONVERTER, AND CONVERTER

(71) Applicant: Robert Bosch GmbH, Stuttgart (DE)

(72) Inventors: Florian Malchow, Stuttgart (DE); Michele Hirsch, Esslingen (DE); Tino Merkel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/609,779

(22) PCT Filed: Apr. 25, 2018

(86) PCT No.: PCT/EP2018/060610
§ 371 (c)(1),
(2) Date: Oct. 31, 2019

(87) PCT Pub. No.: WO2018/202511
PCT Pub. Date: Nov. 8, 2018

(65) Prior Publication Data
US 2020/0067402 A1    Feb. 27, 2020

(30) Foreign Application Priority Data
May 2, 2017    (DE) .......... 10 2017 207 300

(51) Int. Cl.
*H02M 1/32*    (2007.01)
*H02M 7/5387*    (2007.01)
(52) U.S. Cl.
CPC ......... *H02M 1/32* (2013.01); *H02M 7/53875* (2013.01); *H02M 2001/327* (2013.01)

(58) Field of Classification Search
CPC .. H02M 1/32; H02M 7/53875; H02M 7/5387; H02M 2001/327; H02M 2001/0054; B60L 3/003; B60L 15/08
See application file for complete search history.

(56) References Cited

U.S. PATENT DOCUMENTS 5,068,777 A    11/1991 Ito
5,699,240 A    12/1997 Obayashi
(Continued)

FOREIGN PATENT DOCUMENTS

DE    102007018829    11/2008
EP    2833529    2/2015

OTHER PUBLICATIONS

International Search Report for Application No. PCT/EP2018/060610 dated Jul. 13, 2018 (English Translation, 2 pages).

*Primary Examiner* — Emily P Pham
(74) *Attorney, Agent, or Firm* — Michael Best & Friedrich LLP

(57) ABSTRACT

The present invention relates to a variation of the clock frequency for pulse-width-modulated actuation of an electrical converter. In this context, the clock frequency can be specifically lowered in an angle range of an electrical period of an AC current to be output. The specific lowering of the clock frequency during predetermined angle ranges of the electrical period allows the load on the switching elements in the converter to be adjusted. As a result, it is possible, by way of example, to adjust the temperature distribution or thermal load in the converter.

7 Claims, 2 Drawing Sheets

(56) References Cited

U.S. PATENT DOCUMENTS

| | | | | |
|---|---|---|---|---|
| 6,643,150 | B2* | 11/2003 | Kawakami | H02M 7/53875 |
| | | | | 363/132 |
| 2009/0322273 | A1* | 12/2009 | Kallioniemi | B66B 1/30 |
| | | | | 318/503 |
| 2010/0171456 | A1* | 7/2010 | Chakrabarti | H02M 7/53875 |
| | | | | 318/461 |
| 2010/0185350 | A1* | 7/2010 | Okamura | H02P 27/085 |
| | | | | 701/22 |
| 2011/0241587 | A1 | 10/2011 | Najima et al. | |
| 2015/0204730 | A1* | 7/2015 | Daitoku | H02P 29/68 |
| | | | | 374/178 |
| 2016/0315558 | A1* | 10/2016 | Lee | H02M 7/537 |
| 2019/0131887 | A1* | 5/2019 | Mori | H02M 1/08 |

* cited by examiner

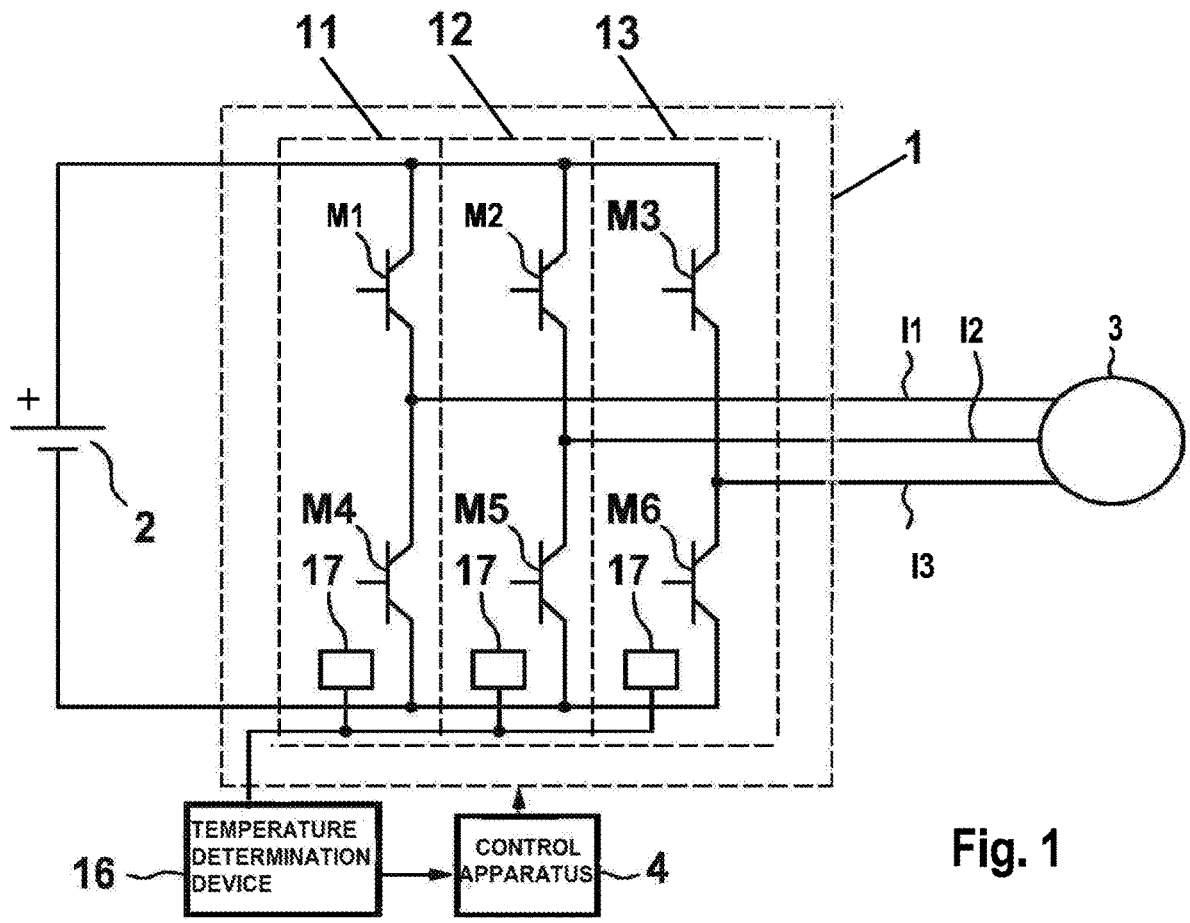
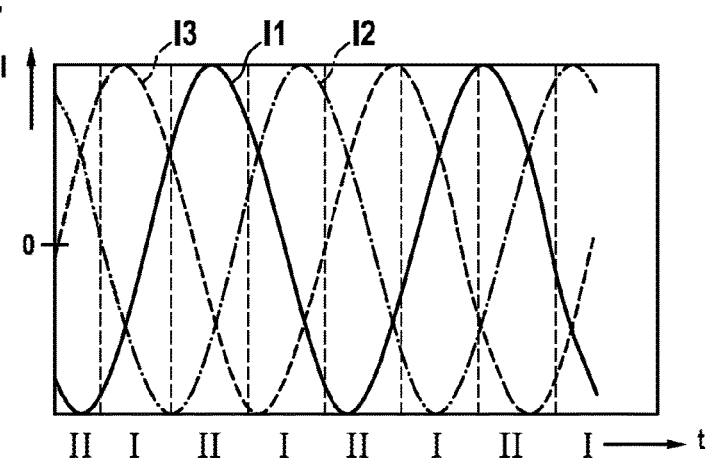
Fig. 1
Fig. 2

METHOD FOR ACTUATING A CONVERTER, CONTROL APPARATUS FOR A CONVERTER, AND CONVERTER

BACKGROUND OF THE INVENTION

The present invention relates to a method for actuating a converter, a control apparatus for a converter and a converter. In particular, the present invention relates to the actuation of a converter in order to optimize a temperature distribution in the converter.

Document DE 10 2007 018 829 A1 discloses a method and an apparatus for actuating a circuit breaker unit. To protect the circuit breaker unit against thermal overloading, a temperature benchmark of the circuit breaker unit is raised, a temperature increase during an operating phase of the circuit breaker unit is determined on the basis of the temporal profile of the temperature benchmark, and the power loss of the circuit breaker unit is subsequently limited such that the temperature increase does not exceed a predefined limit value.

In electric drive systems, an electric machine is generally supplied with electrical energy from an upstream converter. Such converters comprise a plurality of semiconductor switching elements by way of which an electric current and/or an electric voltage is able to be set for the connected electrical machine. In this case, the switching elements are actuated for example by way of a pulse width modulation method. Conventional modulation methods are for example space vector modulation, sinusoidal modulation, flat-top or flat-bottom. In this case, all of the switching elements are generally actuated uniformly during normal operation. During operation, it needs to be ensured in this case that predefined limit values for the loading of the switching elements, such as for example a maximum temperature or the like, are not exceeded.

SUMMARY OF THE INVENTION

The present invention discloses a method for actuating a converter, a control apparatus for a converter and a converter.

Accordingly the following is provided:

A method for actuating a polyphase pulse-width-modulated electrical converter. The method comprises a step of actuating the converter at a first predetermined clock frequency in a first angle range of an electrical period and a step of actuating the converter at a second predetermined clock frequency in a second angle range of the electrical period. The first angle range and the second angle range of the electrical period may in this case comprise, in particular, subranges of an electrical period of an alternating current to be output by the converter.

The following is furthermore provided:

A control apparatus for a polyphase pulse-width-modulated electrical converter. The control apparatus comprises a control device. The control device is designed to provide a control signal for pulse-width-modulated actuation of the converter. In particular, the control device is designed to provide the actuation signal in a first angle range of an electrical period depending on a first predetermined clock frequency and to provide the actuation signal in a second angle range of the electrical period depending on a second predetermined clock frequency. The first angle range and the second angle range of the electrical period may in this case comprise, in particular, subranges of an electrical period of an alternating current to be output by the converter.

The following is also provided:

A converter having a plurality of half-bridges and a control apparatus according to the invention. Each of the half-bridges of the converter comprises a first switching element and a second switching element. The control device is designed to actuate the first switching elements and the second switching elements of the half-bridges by way of the provided control signal.

The present invention is based on the finding that respective limit values that must not be exceeded during operation exist for the components of a converter, in particular for the switching elements that are used therein. These limit values also comprise in particular a maximum operating temperature or a maximum permissible increase in the operating temperature. An absolute or relative increase in the operating temperature may for example be evaluated in this case. A temperature difference, for example a temperature difference between a component (for example a switching element) of the converter and an adjacent component, such as for example a cooling apparatus or a coolant, may also be evaluated as limit value, wherein the temperature difference should as far as possible not exceed a predefined limit value. If the maximum operating temperature or temperature difference is nevertheless exceeded, then there is the risk of the corresponding components being damaged or destroyed or at least premature aging occurring. If a temperature that lies in the region of the maximum operating temperature or even possibly exceeds this maximum operating temperature is reached at one of the switching elements of the converter, then the power of the converter generally has to be reduced in order to avoid destruction or premature aging. In this case, the structure of the converter and of the attached cooling system may possibly lead to very different heating in the individual switching elements. In order to protect the switching elements and the entire converter, the power of the converter in this case already has to be reduced if at least one of the switching elements reaches or possibly exceeds the predefined maximum operating temperature.

One idea of the present invention is therefore to take this finding into account and to provide actuation for a converter in which a temperature development in the individual components, in particular the switching elements of the converter, is able to be equalized. A nonuniform temperature distribution of the switching elements in the converter is thereby able to be counteracted. By way of example, by actuating the individual switching elements in a suitable manner, it is possible to counteract a local temperature increase at one or more switching elements. The converter is thereby able to be operated at maximum power over a very wide range. Premature aging of one or more switching elements is furthermore also able to be taken into account in that a possibly more greatly loaded or already prematurely aged switching element is operated in a more sparing mode of operation, for example at a lower operating temperature.

Switching losses arise due to switching the switching elements in the electrical converter on and off. Pulse-width-modulated actuation of the converter at a high clock frequency therefore leads to the individual switching elements being switched on and off frequently, which as a result also leads to high switching losses. These high switching losses in turn cause intense heating of the corresponding switching elements. On the other hand, the current to be output or the voltage to be output can be set very precisely by way of a high clock rate during the pulse-width-modulated actuation of the converter.

By adjusting the clock frequency for the pulse-width-modulated actuation of the switching elements in the converter within a period of an alternating current to be output or an AC voltage to be output, it is therefore possible on the one hand to set very precisely the current or voltage profile for the alternating current to be output or the AC voltage to be output. Furthermore, through targeted lowering of the clock frequency for the pulse-width-modulated actuation in predefined angle ranges of the period of an alternating current to be output or an AC voltage to be output, a local temperature increase at one or more switching elements in the converter can be counteracted in a targeted manner. In this way, the temperature distribution in the converter can be set in a targeted manner in accordance with predefined boundary conditions. For example, a temperature distribution that is as uniform as possible can be achieved for all switching elements in the converter. Alternatively, it is also possible to deliberately set a lower temperature at one or more switching elements. It is therefore possible to take into account, for example, pre-existing defects or non-uniform aging of the individual switching elements.

In accordance with one embodiment, the method for actuating the converter comprises a step for detecting a temperature and/or a temperature distribution in the converter as well as a step for setting the first angle range and the second angle range of an electric period depending on the determined temperature and/or determined temperature distribution in the converter. In this way, the actuation, in particular the adjustment of the clock frequency in the individual angle ranges, can be adjusted to the temperature or the temperature distribution in the converter in a targeted manner.

In accordance with one embodiment, the first clock frequency is an integer multiple of the second clock frequency. For example, the first clock frequency can be selected to be twice as high as the second frequency. Due to an integer ratio between the first clock frequency and the second clock frequency, the corresponding clock frequencies can be derived from one another particularly easily.

In accordance with one embodiment, the step for detecting the temperature and/or the temperature distribution comprises sensory detection of at least one temperature in the converter. In particular, it is also possible to detect the temperature of each half-bridge or at each switching element of the converter by way of sensors. In this way, it is possible to achieve precise identification of the temperature or the temperature distribution in the converter.

In accordance with one embodiment, the detection of the temperature and/or the temperature distribution in the converter comprises calculation of a temperature and/or a temperature distribution. By calculating the temperature or the temperature distribution in the converter, the hardware outlay, in particular the outlay on necessary temperature sensors, can be reduced. This leads to a further cost reduction. In particular, the temperature and/or the temperature distribution in the converter can be calculated depending on previously defined models.

In accordance with one embodiment of the control apparatus, the control apparatus comprises a temperature determination device. The temperature determination device is designed to ascertain a temperature and/or a temperature distribution in the converter. The control device of the control apparatus is designed to set the first angle range and the second angle range depending on the ascertained temperature and/or the ascertained temperature distribution. In this way, the clock frequency in the individual angle ranges can be adjusted to the temperature or the temperature distribution in the converter in a targeted manner.

In accordance with one embodiment, the control apparatus comprises a temperature sensor. The temperature sensor is designed to detect at least one temperature in the converter. In particular, the temperature sensor can also individually detect the temperature in the individual half-bridges or at the individual converters of the half-bridges. The temperature determination device is designed here to ascertain the temperature and/or the temperature distribution in the converter using the temperature detected by the temperature sensor.

The above configurations and developments can be combined with one another in any desired way, insofar as is practical. Further embodiments, developments and implementations of the invention also encompass not explicitly mentioned combinations of features of the invention described above or below with regard to the exemplary embodiments. In particular, the person skilled in the art here will also add individual aspects as improvements or supplementations to the respective basic forms of the invention.

BRIEF DESCRIPTION OF THE DRAWINGS

The present invention is explained in greater detail below on the basis of the exemplary embodiments indicated in the schematic figures of the drawings, in which:

FIG. 1: shows a schematic illustration of an electric drive system having a converter in accordance with one embodiment;

FIG. 2: shows a schematic illustration of the currents of a three-phase converter;

DETAILED DESCRIPTION

Figure 3:
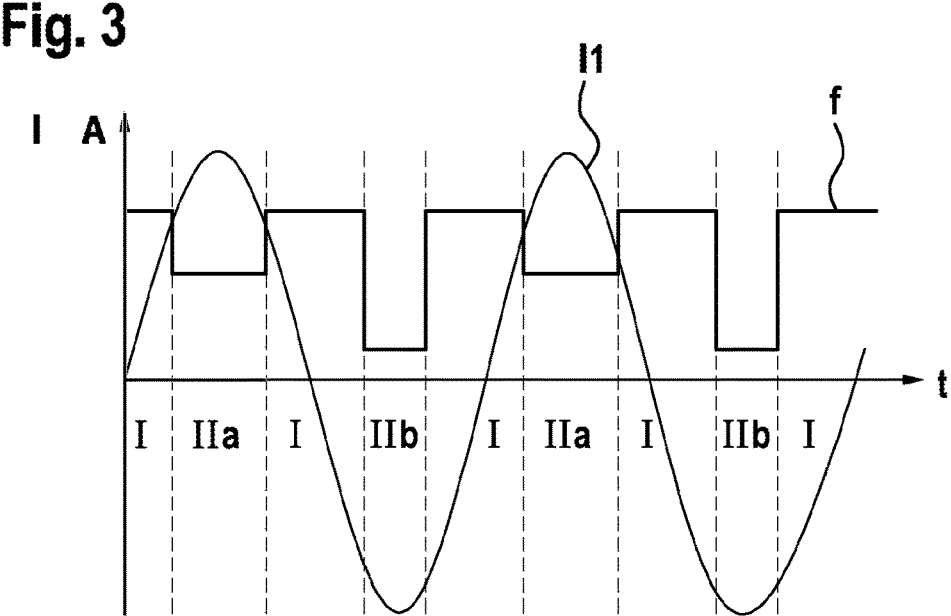
FIG. 3: shows a schematic illustration of the adjustment of the clock frequency in accordance with one embodiment.

FIG. 1 shows a schematic illustration of an electric drive system having a converter 1 in accordance with one embodiment. The input side of the converter is fed by an electrical energy source 2. Said electrical energy source 2 may be, for example, a battery, in particular the traction battery of an electric or hybrid vehicle, for example. The output side of the converter is electrically coupled to an electric machine 3. The converter generates a polyphase AC voltage from the voltage provided on the input side, in this case, for example, a DC voltage, and provides said AC voltage on the output side to the electric machine 3. With the exemplary embodiment illustrated here and the rest of the description, the electric machine 3 is actuated by means of a three-phase AC voltage. However, the present invention is not limited to a three-phase AC voltage. Moreover, the converter 1 can also provide an arbitrary polyphase AC voltage, in particular an AC voltage with more than three phases, in order to actuate the electric machine 3.

In this example, the converter 1 comprises three half-bridges 11, 12, 13 each having an upper switching element M1 to M3 and a lower switching element M4 to M6. The switching elements M1 to M6 of the converter 1 are actuated here by a control apparatus 4 by means of suitable control signals in order to generate the required polyphase output voltage from an input voltage and as a result to impress a polyphase alternating current. To this end, the individual switching elements M1 to M6 of the half-bridges 11 to 13 can be actuated, for example, by the control apparatus 4 by means of pulse-width-modulated signals. In a conventional operating mode, the individual switching elements M1 to M6 of the half-bridges 11 to 13 are generally actuated here in uniform fashion such that a three-phase AC voltage or a three-phase alternating current is provided on the output side.

During the operation of the converter 1, the individual components, in particular the switching elements M1 to M6, heat up. In order to dissipate the heat arising here, the converter 1 can dissipate the thermal energy from the switching elements M1 to M6 for example by means of a cooling apparatus (not illustrated here). To this end, air or a cooling liquid can be used as cooling medium, for example. While the cooling medium flows past the individual switching elements M1 to M6, the cooling medium heats up. If, for example, the cooling medium first flows past the switching elements M1 and M4 of the first half-bridge 11 and then past the switching elements M2 and M5 of the second half-bridge 12 and finally past the switching elements M3 and M6 of the third half-bridge 13, this can lead to the switching elements M1 and M4 of the first half-bridge 11 being cooled to a greater extent than the other switching elements M2, M3, M5 and M6. This can lead to the switching elements that are cooled to a lesser extent, in particular the switching elements M3 and M6 of the third half-bridge 13, heating up to a greater extent.

In this case, the control apparatus 4 can adjust the clock frequency for the pulse-width-modulated actuation of the switching elements M1 to M6 during an AC voltage to be output by the converter 1 depending on the temperatures of the individual half-bridges 11 to 13 or the individual switching elements M1 to M6. Higher clock frequencies during the pulse-width-modulated actuation thus lead to a higher number of switch-on and switch-off processes and also to higher switching losses associated therewith. Lowering the clock frequency during the pulse-width-modulated actuation of the converter 1 therefore results in lower switching losses. Lower switching losses in this case also mean lower thermal heating.

The control apparatus 4 can ascertain the temperature distribution in the converter, in particular the temperatures in the individual half-bridges 11 to 13 or at the individual switching elements M1 to M6. The temperature distribution and/or the temperatures in the converter 1 can be ascertained, for example, by means of a temperature determination device 16 of the control apparatus 4. To this end, a temperature in the converter 1 or individually the temperatures in the individual half-bridges 11 to 13 or at the switching elements M1 to M6 can be detected, for example, by means of one or more temperature sensors 17. Said detected temperatures can be evaluated by means of the temperature determination device 16 in order, for example, to infer an uneven temperature distribution in the converter 1. In particular, it is possible to ascertain, for example, whether the temperature in the converter 1 in a half-bridge 11 to 13 or at at least one of the switching elements M1 to M6 is approaching a maximum permissible operating temperature or possibly even exceeds same. Furthermore, it is also possible to monitor, for example, a temperature difference between the converter 1, in particular in at least one of the half-bridges 11 to 13 or at at least one of the switching elements M1 to M6 on the one hand, and a further temperature at the converter or in the environment of the converter 1. Where appropriate, the adjustment of the clock frequency for the pulse-width-modulated actuation of the converter 1 that is described below can also be adjusted here based on such a temperature difference.

In addition to the sensory detection of the temperature in the converter 1, it is furthermore also possible to calculate the temperature in the converter 1 or the temperature distribution in the converter 1 using a model. To this end, temperature values detected by way of sensors can possibly also be incorporated into the calculation model. Furthermore, it is also possible to incorporate further measurement values or possibly also setpoint value specifications, for example of electric currents in the converter 1, into the calculation of the temperature or the temperature distribution in the converter 1.

FIG. 2 shows a schematic illustration of a current/time diagram for the electric phase currents of a three-phase inverter. The three phases of the currents each have a sinusoidal current profile, wherein the individual phases are respectively offset from one another by 120°. The exemplary embodiment illustrated here with a three-phase AC voltage with the currents I1, I2 and I3 in this case serves purely for better understanding and is not intended to constitute any restriction of the present invention to precisely three phases. Moreover, any desired further converters, in particular inverters, with one of three different numbers of phases are also possible.

If the thermal loading in a converter 1 for example in one of the three half-bridges 11-13 is intended to be reduced with respect to the other half-bridges 11-13, the clock frequency for the pulse-width-modulated actuation in those angle ranges in which the corresponding half-bridge has a particularly high current to conduct can be lowered. For example, the clock frequency of the pulse-width-modulated actuation in a predefined angle range can be lowered before and/or after the maximum of the electric current through the half-bridge to be relieved of load. If the clock frequency of in each case angle ranges of identical size are lowered here before and after the maximum of the electric current, the other two half-bridges are each loaded to the same extent. By asymmetrically lowering the clock frequency in relation to the maximum of the electric current, an asymmetrical loading of the other two phases can also be achieved.

In FIG. 2, for example load relief of the switching elements M3 and M6 can therefore be achieved by virtue of the ranges characterized by II being actuated at a lower clock frequency while the ranges characterized by I are actuated at a higher clock frequency.

For example, the clock frequency for the ranges II can be generated by dividing the clock frequency into the ranges I with an integer factor. The lower clock frequency for the ranges II can therefore be generated, for example, from the clock frequency for the ranges I by means of a corresponding frequency divider in a simple manner. In particular, the clock frequency for the ranges II can be generated very simply from the clock frequency for the ranges I, for example, by simply halving the clock frequency. Moreover, of course any desired other possibilities for generating the individual clock frequencies for the ranges I and II are also possible. In particular, it is not necessarily required that the clock frequency of the ranges I is an integer multiple of the clock frequency for the ranges II.

Furthermore, it is also not necessarily required that the angle range in which the clock frequency is lowered over the upper half-wave corresponds to an angle range in which the clock frequency is reduced over the lower half-wave. In principle, it is also possible that the angle range and/or the ratio between the original clock frequency and the lowered clock frequency are different for the upper half-wave and the lower half-wave. This is illustrated by way of example in FIG. 3.

FIG. 3 shows a schematic illustration of a graph of the clock frequency during an electrical period of an alternating current fed by the electric converter 1 to the electric machine 3. In this case, for the sake of better illustration, only the current I1 of one electrical phase is illustrated. As can be seen in FIG. 3, over the upper half-wave in a range IIa the original clock frequency is lowered to half of said original clock frequency. For example, the clock frequency can be lowered from originally 10 kHz to 5 kHz. Moreover, of course any desired further clock frequencies are also possible. In the rest of the profile, over the lower half-wave of the current I1 the clock frequency is lowered to a third of the original clock frequency in an angle range IIb from shortly before the minimum of the current I1 to shortly after the minimum of the current I1. By lowering the clock frequency to a greater extent, it is also possible here to relieve the corresponding switching element M1 to M6 of load to a greater extent.

As can moreover likewise be seen in FIG. 3, the angle range IIa in which the clock frequency is lowered over the upper half-wave is greater than the angle range IIb in which the clock frequency is lowered over the lower half-wave. In this case too the combination of different angle ranges for the ranges IIa and IIb in which the clock frequency is lowered and also the different lowering of the clock frequencies serves only for better illustration. In principle, it is also possible to individually adjust only the clock frequency or only the length of the angle range in which the clock frequency is lowered for the upper half-wave and the lower half-wave.

Figure 4:
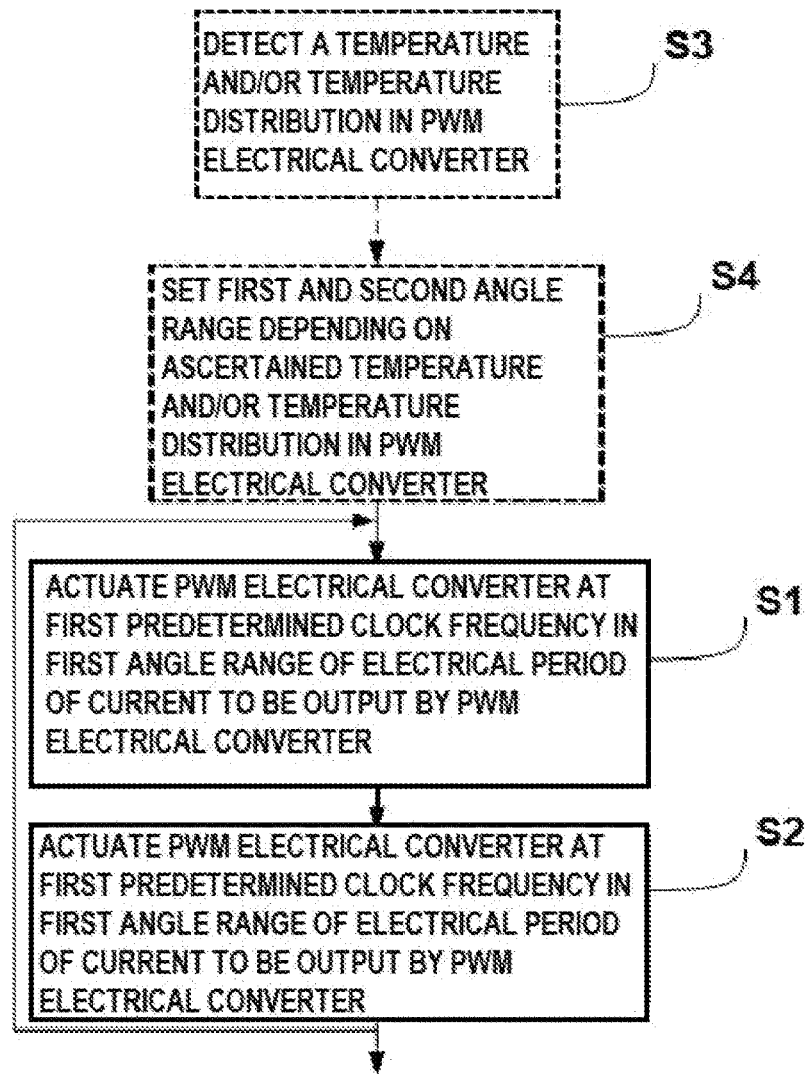
FIG. 4: shows a schematic illustration of a flow diagram as is based on a method for actuating a polyphase converter in accordance with one embodiment.

FIG. 4 shows a schematic illustration of a flow diagram as is based on a method for actuating a pulse-width-modulated electric converter 1 in accordance with one embodiment. In step S1, the converter 1 is actuated here in a first angle range of an electrical period at a first predetermined clock frequency. In step S2, the converter is actuated in a second angle range of the electrical period at a second predetermined clock frequency. In particular, the second predetermined clock frequency is lower than the first predetermined clock frequency. In step S3, a temperature and/or a temperature distribution in the converter 1 can be detected. Subsequently, in step S4, the first angle range and/or the second angle range of the electrical period can be set depending on the ascertained temperature and/or the ascertained temperature distribution in the converter. Moreover, all of the embodiments in connection with the converter 1 described above also apply to the method described here.

In summary, the present invention relates to a variation of the clock frequency for pulse-width-modulated actuation of an electrical converter. In this case, the clock frequency can be lowered in an angle range of an electrical period of an alternating current to be output in a targeted manner. By lowering the clock frequency during predetermined angle ranges of the electrical period in a targeted manner, the loading of the switching elements in the converter can be adjusted. As a result, it is possible, for example, to adjust the temperature distribution or the thermal loading in the converter.

The invention claimed is:

1. A method for actuating a pulse-width-modulated (PWM) electrical converter, the method comprising:
    actuating the PWM electrical converter at a first predetermined clock frequency in a first angle range of an electrical period of a current to be output by the PWM electrical converter;
    actuating the PWM electrical converter at a second predetermined clock frequency in a second angle range of the electrical period of the current to be output by the PWM electrical converter;
    detecting a temperature and/or a temperature distribution in the PWM electrical converter; and
    setting the first angle range and the second angle range depending on an ascertained temperature and/or temperature distribution in the PWM electrical converter.

2. The method as claimed in claim 1, wherein the first clock frequency is an integer multiple of the second clock frequency.

3. The method as claimed in claim 1, wherein the detecting a temperature and/or the temperature distribution comprises sensory detection of at least one temperature in the PWM electrical converter.

4. The method as claimed in claim 1, wherein the detecting a temperature and/or the temperature distribution comprises calculation of a temperature and/or a temperature distribution.

5. A control apparatus for a pulse-width-modulated (PWM) electrical converter, the control apparatus comprising:
    a control device configured to provide a control signal for pulse-width-modulated actuation of the PWM electrical converter, wherein the control device is configured to
        provide the actuation signal in a first angle range of an electrical period of a current to be output by the PWM electrical converter depending on a first predetermined clock frequency; and to
        provide the actuation signal in a second angle range of the electrical period of the current to be output by the PWM electrical converter depending on a second predetermined clock frequency, and
    a temperature determination device configured to ascertain a temperature and/or a temperature distribution in the PWM electrical converter,
    wherein the control device is configured to set the first angle range and the second angle range depending on an ascertained temperature and/or temperature distribution.

6. The control apparatus as claimed in claim 5, further comprising a temperature sensor (17), configured to detect a temperature in the PWM electrical converter,
    wherein the temperature determination device is configured to ascertain the temperature and/or the temperature distribution in the converter using the detected temperature.

7. An electrical converter, comprising:
    a plurality of half-bridges, each comprising a first switching element and a second switching element; and
    the control apparatus as claimed in claim 5,
    wherein the control apparatus is configured to actuate the first switching elements and the second switching elements of the half-bridges by way of the control signal.

* * * * *